UNITED STATES PATENT OFFICE.

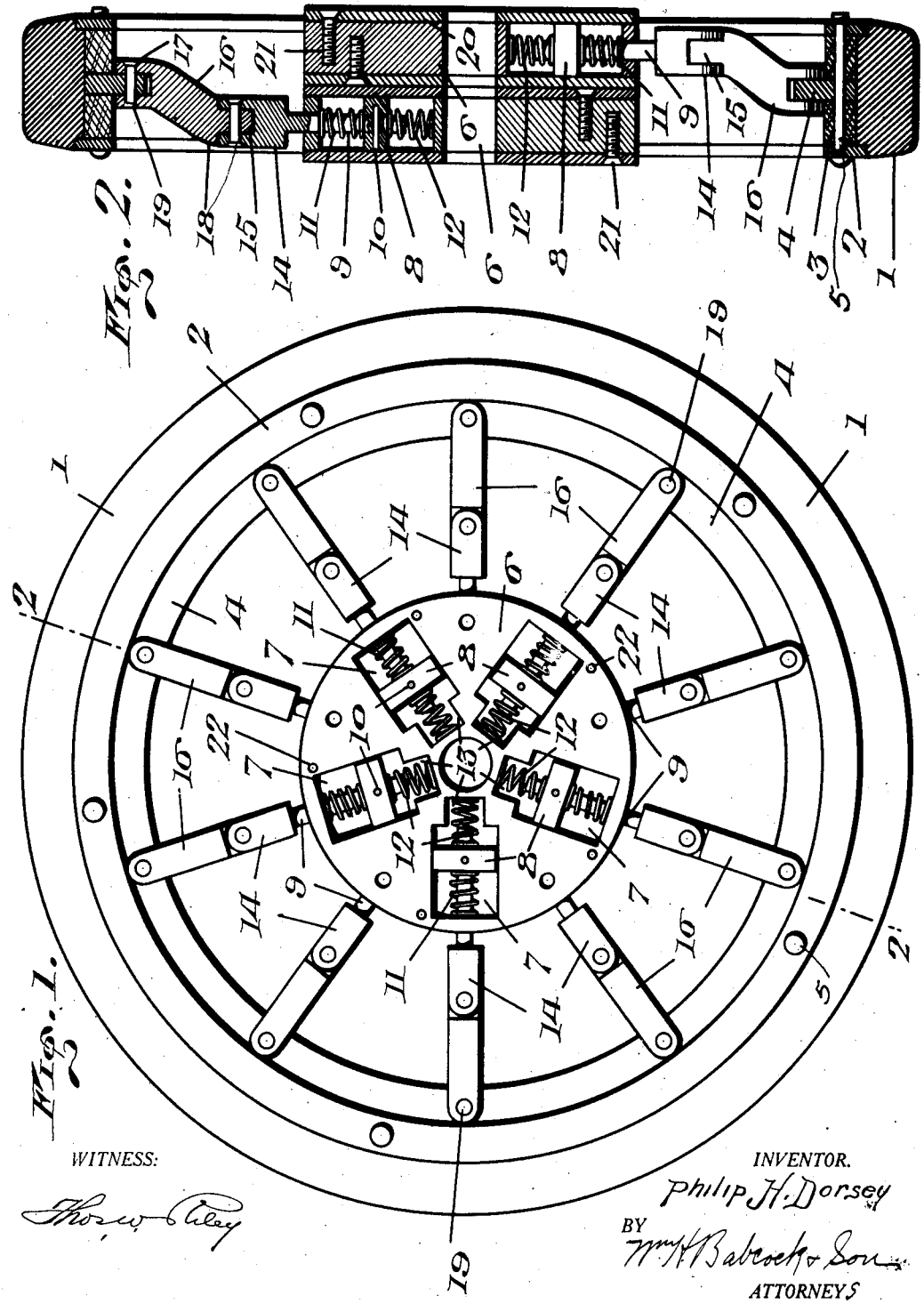

PHILIP H. DORSEY, OF ALGIERS, LOUISIANA.

CUSHION-WHEEL.

1,344,337.     Specification of Letters Patent.     Patented June 22, 1920.

Application filed November 14, 1919. Serial No. 338,020.

*To all whom it may concern:*

Be it known that I, PHILIP H. DORSEY, a citizen of the United States, residing at Algiers, in the parish of Orleans and State of Louisiana, have invented certain new and useful Improvements in Cushion-Wheels, of which the following is a specification.

The present invention relates to resilient wheels, and more particularly to wheels of the spring wheel type in which the tire is yieldingly supported about the hub by means of connections including springs or equivalent means adapted to take up or absorb shocks received by the tire and prevent their transmission to the hub and, through it, to the vehicle body.

One of the objections to existing wheels of this type is that they are not sufficiently sensitive and, therefore, only very imperfectly absorb the shocks. Another objection is the complexity of the connections between the hubs and tires or outer wheel members. A further objection is the weakness of these connections for effecting a drive of the tire from the hub. Among the forms of this type involving the above objections is the form having telescopic spoke sections, one section pivoted or otherwise connected at one end to the hub and receiving the other section, while such other section is pivoted to the inner face of the felly or tire, the spring or other shock absorbing element being disposed between them. An additional objection to this form is the weakness of its resistance to side thrust in making a turn or rounding corners. The purpose of this invention is to overcome these and other objections and to provide a wheel of this type which is simply constructed and may be quickly manufactured at a reasonable cost.

In order to more clearly disclose the invention, a preferred form is shown in the accompanying drawings and will be more fully set forth in the following specification and claims, though it is clear that many structural changes and changes in the arrangements of various parts may be made without in any degree departing from the field and scope of the invention, and it is meant to include them within the scope of the appended claims.

In the drawings:

Figure 1 is a side elevation of the invention, with one cap plate removed, and

Fig. 2 is a cross section on line 2—2 of Fig. 1.

In the present wheel the tire comprises the tread 1 clamped between the side rings 2, which are kept in their spaced relation by the felly sections 3, between which is held a connecting or driving ring 4. The parts 1, 2, 3 and 4 are all secured together to form a unitary structure or tire by means of securing bolts 5 passing laterally through members 2, 3 and 4. The hub comprises two simple duplicate castings 6, each having a plurality of radially disposed oblong openings or spring receiving pockets 7, and each opening in turn has an inwardly extending radially disposed notch 13 for a purpose to be later disclosed. In the outer circumferential face of each casting and in line with the longitudinal center of each opening 7, and communicating therewith, is formed a small bore for a purpose to be later disclosed. Within each opening 7 and having a close sliding fit between the walls thereof is a guide block 8, through the center of which extends a post 9. Each block is fixed to its post by a connecting pin 10 in such manner that there can be no relative motions between them. Disposed about each post are two coil springs 11 and 12, one arranged between the block 8 and the outer or circumferential wall of the opening 7, and the other between the block and the bottom or inner wall of the notch 13. The springs are so balanced as to normally keep each block about midway of the combined length of its opening 7 and notch 13, as will be readily understood. The outer end of each post is provided with a U-shaped forked end 14 which receives the reduced inner end 15 of a diagonally disposed radially extending spoke 16 terminating in an outer radially disposed U-shaped fork 17. A pivot pin 18 provides flexible connection between the reduced end 15 and fork 14. Fork 17 is similarly flexibly connected to the driving ring 4 by a pivot pin 19.

Caps or plates 20 secured to the opposite faces of each casting or block by screws 21 or other suitable means serve to complete the hub elements and prevent entrance of foreign objects into the openings 7. The two hub elements are secured together by screws 22 passed from opposite sides through one and threaded into the other, or bolts may be run clear through both and nuts turned upon the projecting ends, or any other suitable fastening means may be used.

In securing the hub elements together they are so disposed relatively to each other that the openings 7 of one will alternate with those of the other, all of the openings being equally spaced circumferentially about the center of the wheel. On reference to Fig. 2 it will be seen that the offset of the spoke sections of one hub element are in a direction opposite to that of the spoke sections of the other hub element. This, together with the alternation above set forth, places the points of connection between ring 4 and the spoke sections in direct radial lines from the center of the wheel to the center of the tire. At the same time it provides one set of spoke sections disposed to resist side thrust from one direction, as in turning a corner, and another and similar set disposed to resist side thrust from the opposite direction, as in turning a corner in the opposite direction.

The two pivot pins 18 and 19 and the connecting pin 10 in each instance are parallel and in the same plane, which is radial with relation to the wheel. Also they are at right angles to the radius and to the ring 4. Consequently, the only movements allowed each post 9 are simple inward and outward movements toward and from the tire and wheel center, or radially. No turning movement of any kind is possible, because of block 8 fixed by pin 10. Likewise the only movements of each spoke section are rocking movements about the two pivotal connections 18 and 19 at the same angle both to the circumference of the wheel and to the radius of the wheel, and in the direction of the circumference of the wheel. The pivot connections prevent any other rocking, turning or twisting movements. Thus a limited cushioned or yielding inward movement against the power of the shock absorbing springs is allowed whenever the tire meets an obstacle, while at the same time every other movement is stoutly resisted and prevented. The yielding connections between the spoke sections and driving ring and sliding posts respectively provide adequate means for transmitting the driving power from the hub to the tire, or vice versa. At the same time their flexibility dispels the first sudden shocks of the impact of the tire against any unevenness in the road or any obstacles or obstructions met. Shocks thus received and partially dispelled are transmitted through the flexible connections to the absorbing springs, where they are practically entirely eliminated.

Although the hub has been shown as comprising two elements connected together, it is clear that it could be made as a single casting complete, or each element could have one of the face plates cast integral with the body portion, the other only being separate.

Obviously, many changes may be made in structural details, as also in the disposition of the various parts, without in any manner departing from the field and scope of the invention, and it is meant to include all such within the scope of the appended claims.

Having thus described my invention, what I claim and desire to protect by Letters Patent is:

1. A resilient wheel comprising a tire, a hub, posts movably mounted in said hub, shock absorbing means coöperating with said posts, diagonally disposed and radially extending spoke sections, and flexible connections between said spoke sections and said tire and posts, respectively.

2. A resilient wheel comprising a tire, a hub provided with pockets arranged alternately in its opposite faces, posts slidably mounted in said pockets, shock absorbing means coöperating with said posts, oppositely directed spoke sections, and flexible connections between said spoke sections and said posts and tire, respectively.

3. A resilient wheel comprising a tire, a hub provided with pockets arranged alternately in its opposite faces, posts slidably mounted in said pockets, oppositely directed spoke sections, and pivotal connections between said spoke sections and posts and tire, respectively, said connections being parallel and in a plane perpendicular to the wheel face.

4. A resilient wheel comprising a tire, a hub provided with pockets arranged alternately in its opposite faces, nonrotatable blocks slidably mounted in said pockets, posts extending through said blocks and sliding in said pockets, means for fixing said blocks to said posts and preventing relative rotation between them, shock absorbing means coöperating with said posts, diagonally disposed spoke sections alternately arranged in opposite directions, and flexible connections between said spoke sections and said posts and tire, respectively, said connections being parallel and in a plane perpendicular to the wheel face.

5. A resilient wheel comprising a tire, two similar hub elements each provided with a plurality of equidistant radially directed pockets, means for connecting said elements in such position that the pockets in one alternate with the pockets in the other, posts slidably mounted in said pockets, spoke sections, and flexible connections between said spoke sections and said posts and tire respectively.

6. A resilient wheel comprising a tire, two similar hub elements each provided with a plurality of equi-distant radially directed pockets, means for connecting said elements in such position that the pockets in one alternate with the pockets in the other, posts slidably mounted in said pockets, oppositely inwardly directed spoke sections, and pivotal connections between said spoke sections and said posts and tire, respectively.

7. A resilient wheel comprising a tire, two similar hub elements each provided with a plurality of equi-distant radially directed pockets, means for connecting said elements in such position that the pockets in one alternate with the pockets in the other, posts radially slidably mounted in said pockets, alternately oppositely directed, radially extending and inwardly laterally offset spoke sections, and pivotal connections between said spoke sections and said posts and tire, respectively, said connections being parallel and in a plane perpendicular to the wheel face.

8. A resilient wheel comprising a tire, a hub provided with pockets arranged alternately in its opposite faces, posts slidably mounted in said pockets, alternately oppositely directed radially extending and inwardly laterally offset spoke sections, and pivotal connections between said spoke sections and said posts and tire, respectively, said connections being parallel and in a plane perpendicular to the wheel face.

In testimony whereof, I have signed my name to this specification in the presence of two subscribing witnesses.

PHILIP H. DORSEY.

Witnesses:
T. J. DOBBINS,
D. CONWAY FINAN.